(12) United States Patent
Balmer

(10) Patent No.: US 10,193,365 B2
(45) Date of Patent: Jan. 29, 2019

(54) CHARGING PACK WITH FLEXIBLE ATTACHMENT MEMBERS

(71) Applicant: Daymen US, Inc., Petaluma, CA (US)

(72) Inventor: Noah Balmer, Santa Rosa, CA (US)

(73) Assignee: Vitec Holdings Italia SRL, Cassola (IT)

( * ) Notice: Subject to any disclaimer, the term of this patent is extended or adjusted under 35 U.S.C. 154(b) by 0 days.

(21) Appl. No.: 15/353,573

(22) Filed: Nov. 16, 2016

(65) Prior Publication Data
US 2017/0279289 A1    Sep. 28, 2017

Related U.S. Application Data

(60) Provisional application No. 62/255,534, filed on Nov. 16, 2015.

(51) Int. Cl.
| | |
|---|---|
| H02J 7/00 | (2006.01) |
| H01M 10/42 | (2006.01) |
| H01M 10/46 | (2006.01) |
| G06F 1/16 | (2006.01) |
| H01M 2/20 | (2006.01) |

(52) U.S. Cl.
CPC .......... *H02J 7/0054* (2013.01); *G06F 1/1632* (2013.01); *H01M 2/20* (2013.01); *H01M 10/425* (2013.01); *H01M 10/46* (2013.01); H01M 2220/30 (2013.01); H02J 7/0045 (2013.01)

(58) Field of Classification Search
CPC ..... Y02E 60/12; H01M 2/1055; H01M 10/46; H01M 2/1022; H02J 7/0044; H02J 7/0042; H02J 7/0045
USPC ........................................................ 320/110
See application file for complete search history.

(56) References Cited

U.S. PATENT DOCUMENTS

| | | | | |
|---|---|---|---|---|
| 2004/0085043 | A1* | 5/2004 | Germagian | H02J 7/0042 320/107 |
| 2004/0196001 | A1* | 10/2004 | Kwon | G06F 1/1626 320/112 |
| 2006/0125445 | A1* | 6/2006 | Cao | H02J 7/0031 320/112 |
| 2011/0309794 | A1* | 12/2011 | Budziszek | H02J 7/32 320/114 |
| 2014/0168866 | A1* | 6/2014 | Armstrong | H05K 5/0021 361/679.01 |
| 2014/0191033 | A1* | 7/2014 | Wojcik | G06K 7/082 235/449 |
| 2015/0093623 | A1* | 4/2015 | Huang | H01M 2/1022 429/99 |
| 2016/0261133 | A1* | 9/2016 | Wang | H02J 7/025 |

* cited by examiner

*Primary Examiner* — Arun C Williams
(74) *Attorney, Agent, or Firm* — Michael A. Guth

(57) ABSTRACT

A charging pack for an electronic device which includes flexible members adapted to snugly attach the charging pack to an electronic device such as a cellular telephone. The flexible members may stretch to capture the corners of the cellular telephone. The flexible members may reside along a back surface of the charging pack in a stowed configuration. The flexible members may stretch over the corners of the charging pack main body to provide protection to the charging pack.

4 Claims, 25 Drawing Sheets

CHARGING PACK WITH FLEXIBLE ATTACHMENT MEMBERS

CROSS-REFERENCE TO RELATED APPLICATIONS

This application claims priority to U.S. Provisional Application No. 62/255,534 to Balmer, filed Nov. 16, 2015.

BACKGROUND

Field of the Invention

The claimed relates to a charging pack for an electronic device.

Description of Related Art

SUMMARY

A charging pack for an electronic device which includes flexible members adapted to snugly attach the charging pack to an electronic device such as a cellular telephone. The flexible members may stretch to capture the corners of the cellular telephone. The flexible members may reside along a back surface of the charging pack in a stowed configuration. The flexible members may stretch over the corners of the charging pack main body to provide protection to the charging pack.

DETAILED DESCRIPTION

Figure 1:
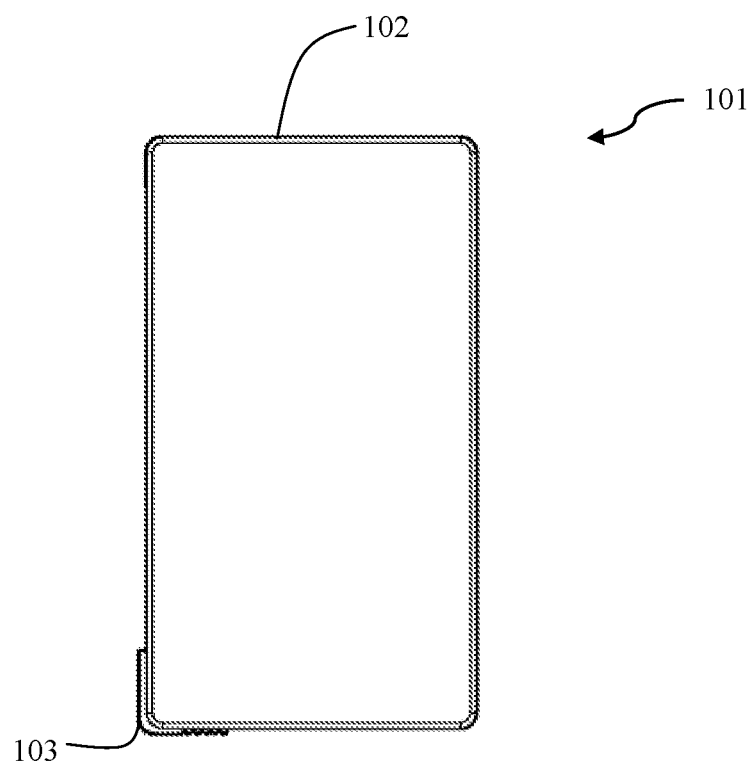
FIG. 1 is a front view of a charging pack for an electronic device in a first, stowed, configuration.

FIGS. 1-7 illustrate an embodiment of a charging pack for an electronic device 101 in a first configuration. In some embodiments, the main body 102 of the charging pack 101 is substantially rectangular. In an exemplary embodiment, the main body 102 is 103.6 mm×58 mm×9.4 mm. On a rear surface of the main body 102 resides a flexible member 104. The flexible member 104 is affixed to the rear surface of the main body 102 at an attachment portion 149 of the flexible member 104. In an exemplary embodiment, the flexible member 104 is silicone and has a dimension, while not extended, of 102.6 mm×44 mm×2 mm. The silicone flexible member may be sized and otherwise specified such that the flexible member is able to stretch over, but still snugly hold, electronic devices of varying sizes. In some aspects, the flexible member may extend through slots or holes in the main body to facilitate attachment to the main body. In some aspects, the flexible member may be bonded to the main body.

The charging pack 101 is adapted to have a variety of configurations. In a first, stowed, not extended, configuration, the flexible member 104 resides along the back of the main body 102. In another configuration, as seen in FIGS. 8-15, portions of the flexible members are stretched over the corners of the main body of the charging pack. In this configuration, the resilient silicone resides snugly over the charging pack main body affording impact protection, while also residing tightly enough over the main body that the stretched flexible member portions can remain in place over the corners of the main body as the user inserts and removes the unit from a pants pocket, for example. In yet another configuration, as seen in FIGS. 21-26, portions of the flexible member are further extended to tightly hold the charging pack onto and against an electronic device such as a cellular telephone. As further described below, in this configuration a power cord from the charging pack may be plugged into the electronic device, allowing energy flow from a battery or batteries within the charging pack into the electronic device.

Figure 2:
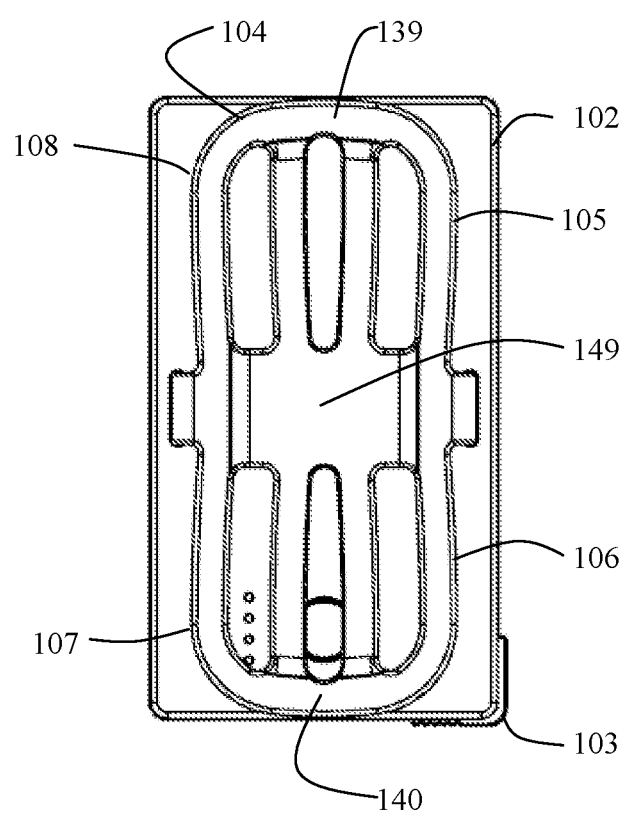
FIG. 2 is a back view of a charging pack for an electronic device in the first configuration.
Figure 3:
FIG. 3 is a top view of a charging pack for an electronic device in the first configuration.
Figure 4:
FIG. 4 is a bottom view of a charging pack for an electronic device in the first configuration.
Figure 5:
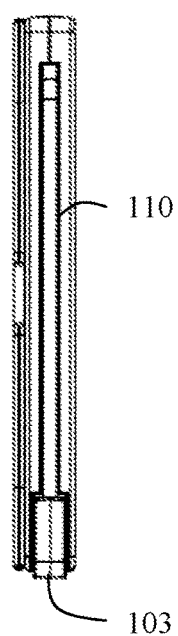
FIG. 5 is a left side view of a charging pack for an electronic device in the first configuration.
Figure 6:
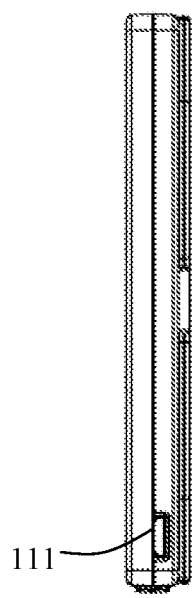
FIG. 6 is a right side view of a charging pack for an electronic device in the first configuration.
Figure 7:
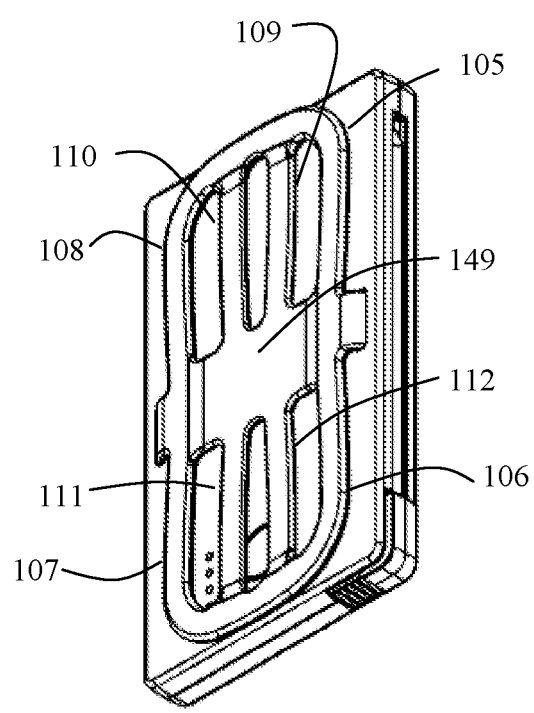
FIG. 7 is a rear perspective view of a charging pack for an electronic device in the first configuration.
Figure 8:
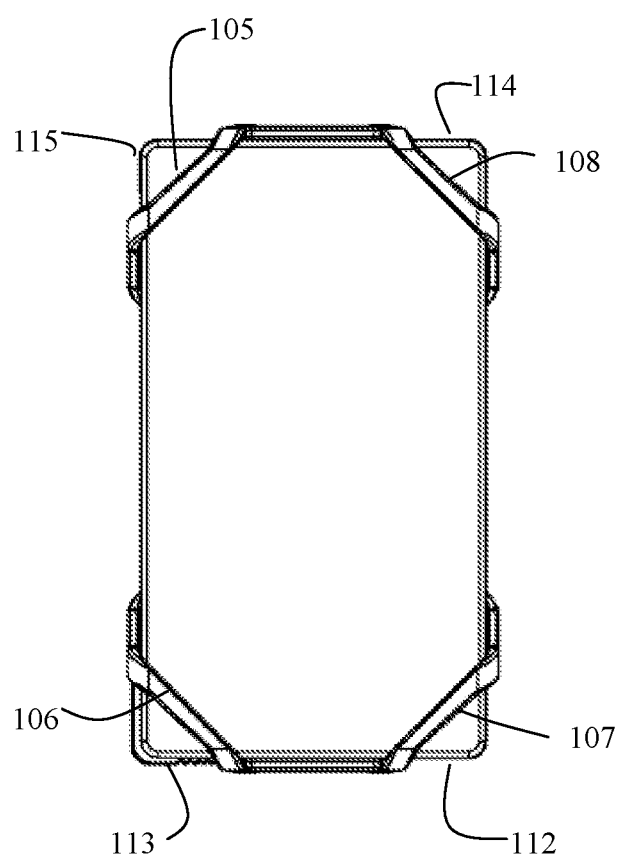
FIG. 8 is a front view of a charging pack for an electronic device in a second configuration with the flexible members pulled over the charging pack body.
Figure 9:
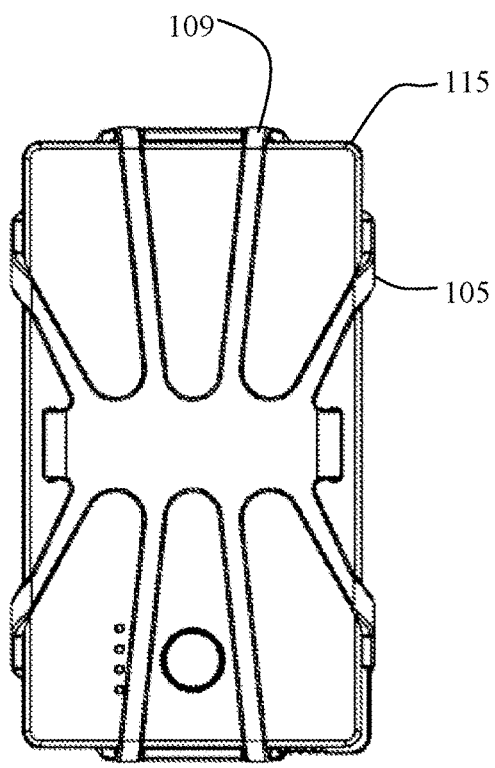
FIG. 9 is a rear view of a charging pack for an electronic device in the second configuration.
Figure 10:
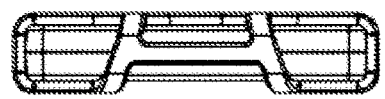
FIG. 10 is a top view of a charging pack for an electronic device in the second configuration.
Figure 11:
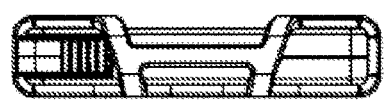
FIG. 11 is a bottom view of a charging pack for an electronic device in the second configuration.
Figure 12:
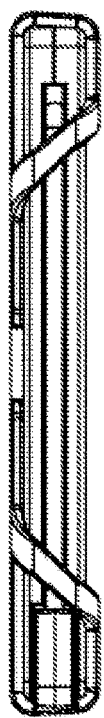
FIG. 12 is a left side view of a charging pack for an electronic device in the second configuration.
Figure 13:
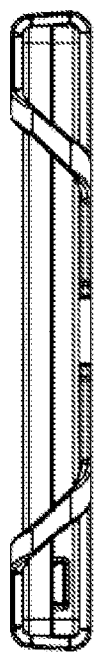
FIG. 13 is a right side view of a charging pack for an electronic device in the second configuration.
Figure 14:
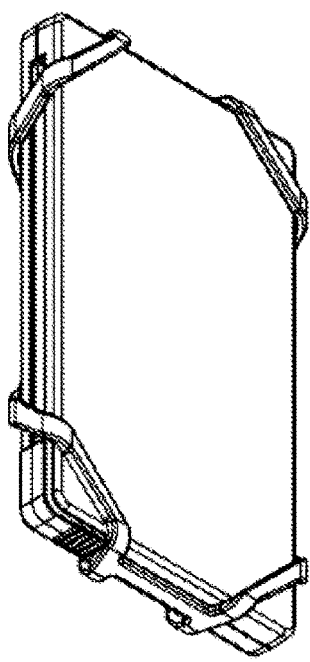
FIG. 14 is a lower front perspective view of a charging pack for an electronic device in the second configuration.
Figure 15:
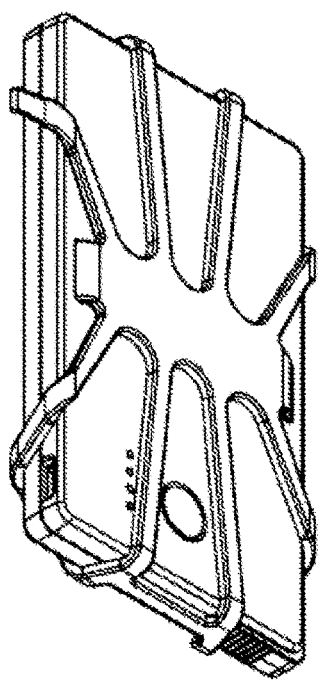
FIG. 15 is a lower rear perspective view of a charging pack for an electronic device in the second configuration.
Figure 16:
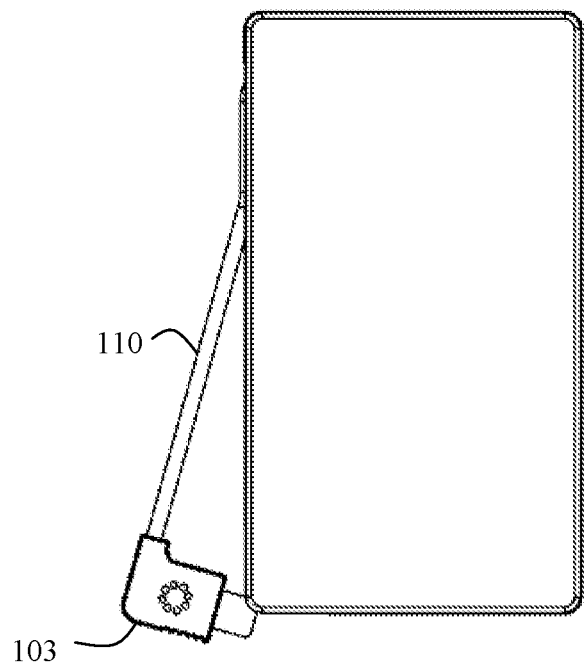
FIG. 16 is a front view of a charging pack for an electronic device in a third configuration with the power cord partially deployed.
Figure 17:
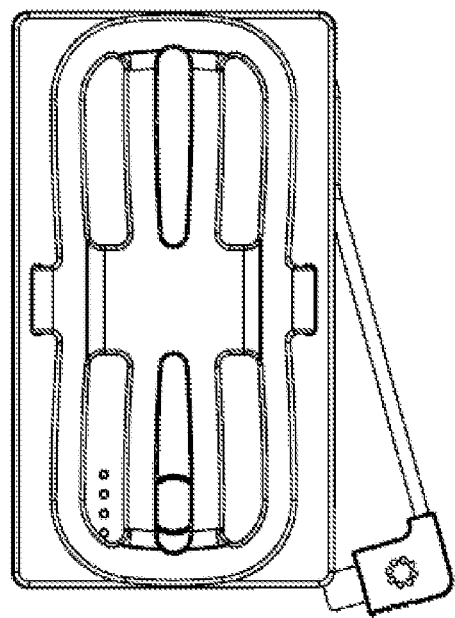
FIG. 17 is a rear view of a charging pack for an electronic device in the third configuration.
Figure 18:
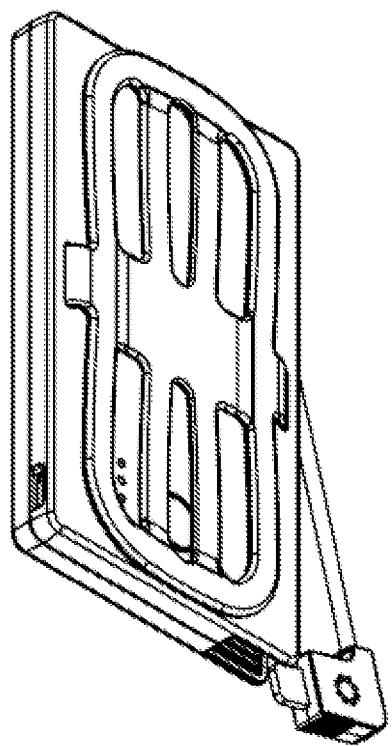
FIG. 18 is a lower rear perspective view of a charging pack for an electronic device in the third configuration.
Figure 19:
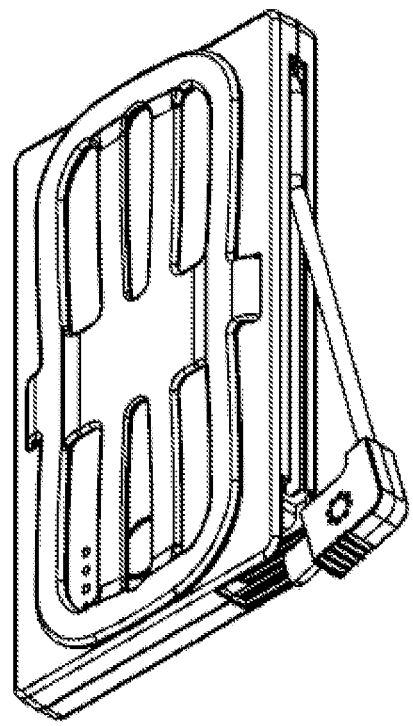
FIG. 19 is a lower side perspective view of a charging pack for an electronic device in the third configuration.
Figure 20:
FIG. 20 is a bottom view of a charging pack for an electronic device in the third configuration.
Figure 21:
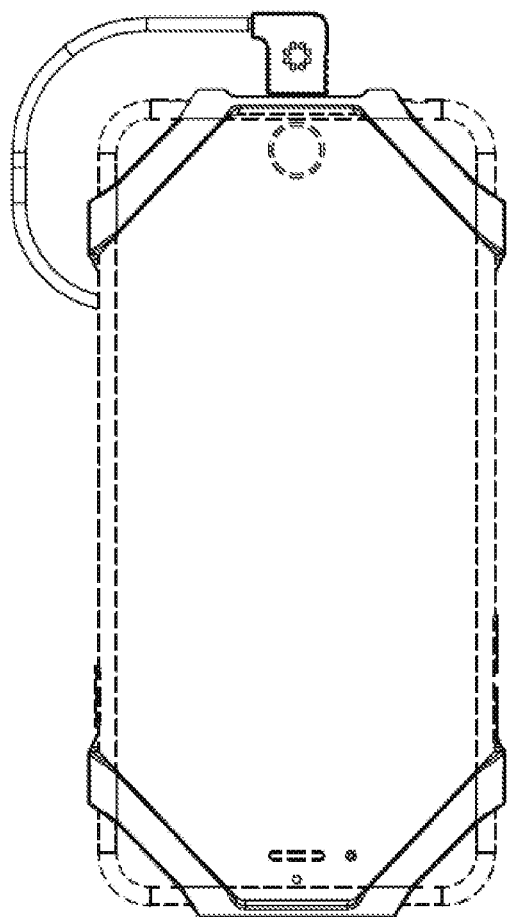
FIG. 21 is a front view of a charging pack for an electronic device in a fourth configuration attached to a cellular telephone.
Figure 22:
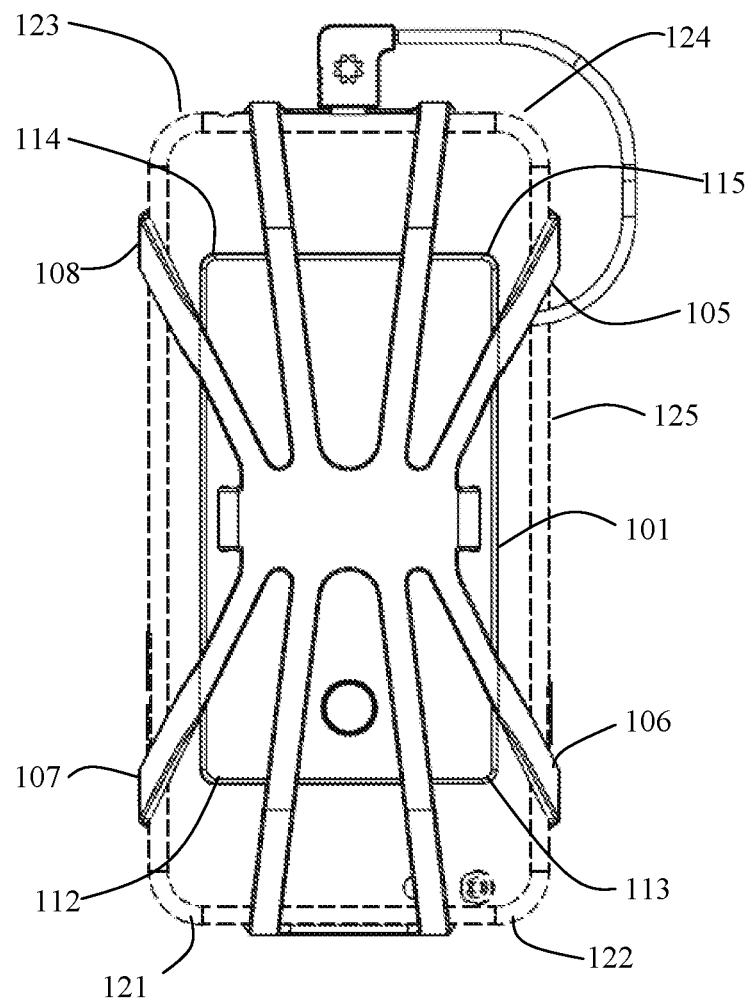
FIG. 22 is a rear view of a charging pack for an electronic device in the fourth configuration.
Figure 23:
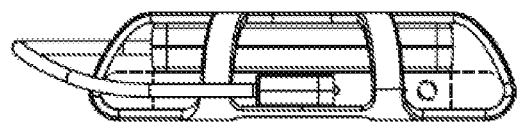
FIG. 23 is a top view of a charging pack for an electronic device in the fourth configuration.
Figure 24:
FIG. 24 is a right side view of a charging pack for an electronic device in the fourth configuration.
Figure 25:
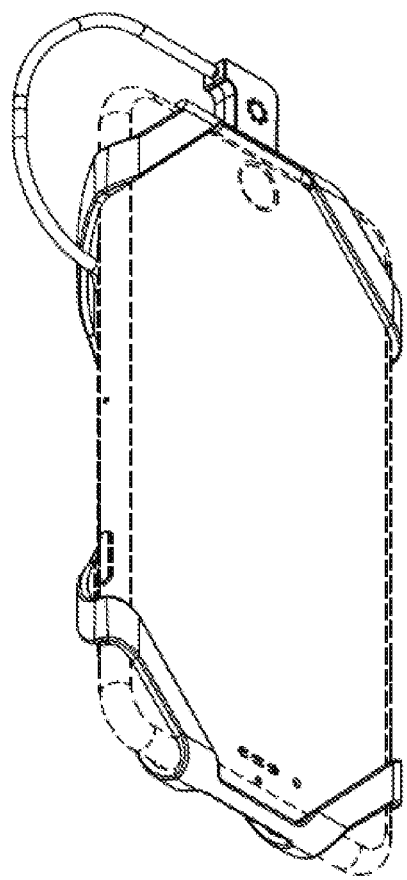
FIG. 25 is a front lower perspective view of a charging pack for an electronic device in the fourth configuration.
Figure 26:
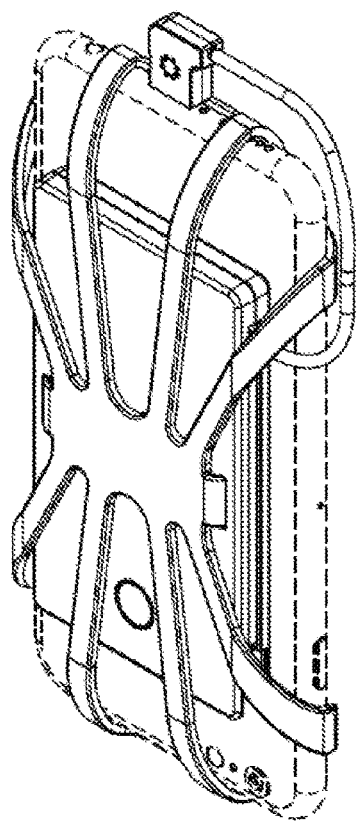
FIG. 26 is a rear side perspective view of a charging pack for an electronic device in the fourth configuration.

FIGS. 2 and 7 best illustrate details of flexible member 104 in an exemplary embodiment. The flexible member 104 is attached to the main body of the charging pack at an attachment portion 149. The flexible member 104 has a plurality of elements which allow for stretching of the elements and attaching to electronic devices. An upper right outer band 105 and an upper right inner band 109 allow for stretching around an adjacent corner, whether of the charging pack itself, or of another device. An upper left outer band 108 an upper left inner band 110 also allow for stretching around an adjacent corner of a device. An upper middle band 139 joins the upper right and left areas. A lower right outer band 106 and a lower right inner band 112 allow for stretching around an adjacent corner, whether of the charging pack itself, or of another device. A lower left outer band 107 a lower left inner band 107 also allow for stretching around an adjacent corner of a device. A lower middle band 140 joins the lower right and left areas.

A deployable connector 103 resides within a recess in the main body of the charging pack. A power cable 110 routes power from within the charging pack to the connector 103. An electrical port 111 may be used to route power into the batteries within the charging pack in some embodiments.

Within the main body is a battery with a size, in an exemplary embodiment, of 103.6 mm×58 mm×9.4 mm. The battery capacity is 3200 mAh. Exemplary output voltage is DC 1.5V, 1.5 A max, 0.7 Wh.

FIGS. 8-15 illustrate another configuration of the charging pack wherein the flexible elements have been stretched to go over adjacent corners of the main body of the charging pack. This configuration allows for some impact protection for the charging pack, as well as putting the flexible elements into a taut configuration which keeps them in a low profile for insertion into a pocket, for example. The upper right outer band 105 may go around a first upper corner 115 of the charging pack, and the upper left outer band 108 may go around a second upper corner 114 of the charging pack. The lower right outer band 106 may go around a first lower corner 113 of the charging pack, and the lower left outer band 107 may go around a second lower corner 112 of the charging pack.

FIGS. 16-20 illustrate the deployable aspect of the connector 103 and its cable 110. When stowed, the connector 103 has a slight frictional fit to hold it into a mating recess in the main body of the charging pack. The cable 110 also resided within a mating recess within the main body of the charging pack.

FIGS. 21-26 illustrate the charging pack 101 in use with an electric device 125, which may be a smartphone, for example. This configuration allows for the very snug attachment of the charging pack to the electric device with the use of the extension of the flexible members. The upper right outer band 105 may go around a first upper corner 124 of the electronic device, and the upper left outer band 108 may go around a second upper corner 123 of the electronic device. The lower right outer band 106 may go around a first lower corner 122 of the electronic device, and the lower left outer band 107 may go around a second lower corner 121 of the electronic device. The mounting configuration allows for a surface of the main body of the charging pack to be in contact with the back surface of the electronic device, such as a smart phone. This mounting configuration thus allows for inductive charging of the electronic device by the charging pack should the charging pack be adapted to support that type of charging.

Figure 27:
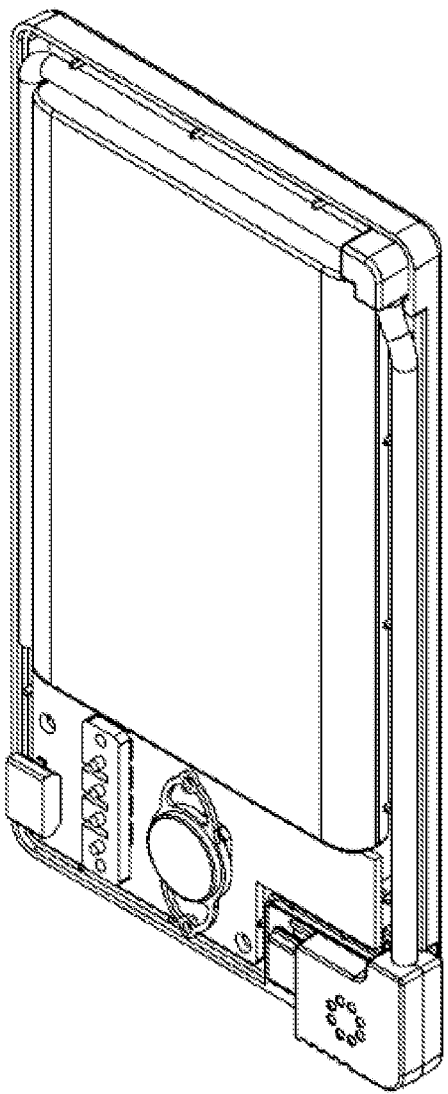
FIG. 27 is a partial cutaway view of a charging pack for an electronic device.
Figure 28:
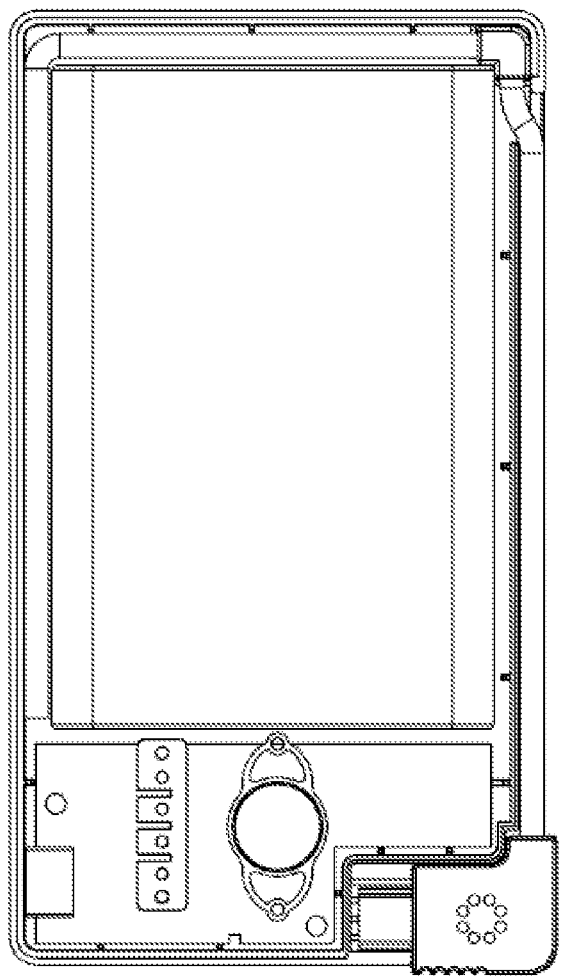
FIG. 28 is a partial cutaway view of a charging pack for an electronic device.
Figure 29:
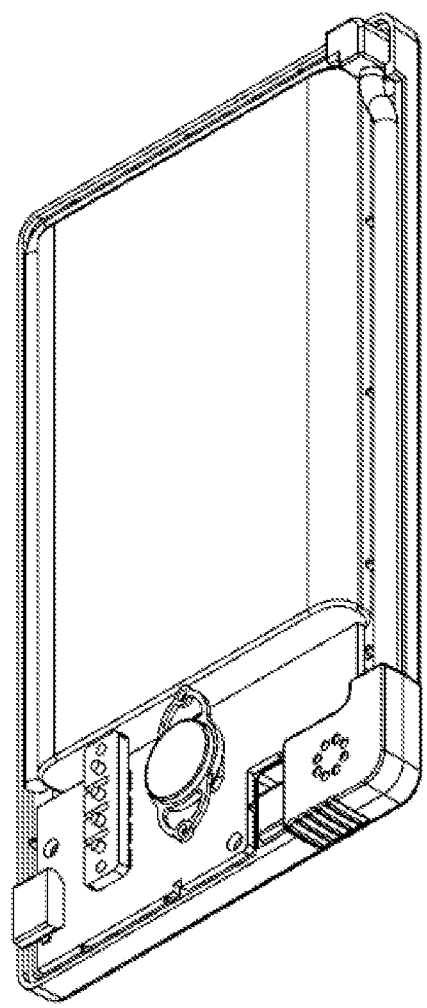
FIG. 29 is a partial cutaway view of a charging pack for an electronic device.

FIGS. 27-29 illustrate internal components of the charging pack. Within the charging pack are a battery and power control electronics adapted to allow for charging of the battery, and to allow for discharge of the battery through the use of an electronic device.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. A charging pack for an electronic device, said charging pack comprising:
   a main body, wherein said main body is rectangular, said main body having a front and a back;
   a battery inside said main body adapted to deliver power to an electronic device; and
   a flexible element, said flexible element attached to said body, said flexible element adapted to attach the charging pack to an electronic device, said flexible element comprising:
      a central attachment portion affixed to said main body;
      a first outer band portion adapted to capture a first corner of an electronic device, said first outer band portion comprising a first end and a second end, wherein said first outer band portion is coupled to said central attachment portion at said first end and said second end of said first band portion;
      a second outer band portion adapted to capture a second corner of an electronic device, said second outer band portion comprising a first end and a second end, wherein said second outer band portion is coupled to said central attachment portion at said first end and said second end of said second band portion;
      a third outer band portion adapted to capture a third corner of an electronic device, said third outer band portion comprising a first end and a second end, wherein said third outer band portion is coupled to said central attachment portion at said first end and said second end of said third band portion; and
      a fourth outer band portion adapted to capture a fourth corner of an electronic device, said fourth outer band portion comprising a first end and a second end, wherein said fourth outer band portion is coupled to said central attachment portion at said first end and said second end of said fourth band portion;
   wherein said flexible element resides along the back of said main body while in a stowed configuration, and wherein said first, second, third, and fourth outer band portions of said flexible element are stretched over the corners of said rectangular main body while in a second configuration.

2. The charging pack of claim 1 further comprising an outlet cable coupled to said main body.

3. The charging pack of claim 1 wherein said main body comprises an inlet connector adapted to receive power input for charging said battery.

4. The charging pack of claim 1 wherein said main body comprises an inlet connector adapted to receive power input for charging said battery.

* * * * *